United States Patent Office 2,817,676
Patented Dec. 24, 1957

2,817,676

CHLOROARYLOXYACETATES AND CHLOROARYLOXYPROPIONATES OF THE PARTIAL ESTERS OF 2,2-DICHLOROPROPIONIC ACID AND AN ALIPHATIC POLYHYDRIC ALCOHOL

Charles T. Pumpelly and Edgar C. Britton, Midland, Mich., assignors to The Dow Chemical Company, Midland, Mich., a corporation of Delaware No Drawing. Application April 22, 1954
Serial No. 425,022

6 Claims. (Cl. 260—473)

The present invention relates to the chloroaryloxyacetates and chloroaryloxypropionates of the partial esters of 2,2-dichloropropionic acid and a polyhydric alcohol of the aliphatic series. These compounds are viscous liquids or resinous materials which are somewhat soluble in many organic solvents and of low solubility in water. They have been found to be active as plant growth control materials and are adapted to be employed in dust and spray compositions for the control of the growth and killing of weeds and for the sterilization of soil with regard to plant growth.

The new compounds may be prepared by reacting together (1) a chloroaryloxyacetic acid or chloroaryloxypropionic acid and (2) a partial ester of 2,2-dichloropropionic acid and an aliphatic polyhydric alcohol such as glycerol, ethylene glycol, propylene glycol, trimethylene glycol, butylene glycol and the di- and trialkylene glycols of the ethylene, propylene, and trimethylene series, i. e. diethylene glycol, triethylene glycol, dipropylene glycol, tripropylene glycol, di(trimethylene) glycol and tri(trimethylene) glycol. Good results are obtained when the chloroaryloxyacetic acid or chloroaryloxypropionic acid is reacted with an equivalent proportion of the partial ester reagent, i. e. when stoichiometric proportions of the reagents are employed. However, a large excess of the acid or a small excess of the partial ester reagent may be employed in the reaction mixture. Such excess does not appreciably effect the course of the reaction. The reaction may be carried out in the presence of an esterification catalyst such as sulfuric acid or phenolsulfonic acid and conveniently in a water-immiscible solvent such as ethylene dichloride, monochlorobenzene or toluene. The removal from the reaction zone of the water of reaction as formed generally results in optimum yields of the desired ester products.

In carrying out the reaction, the acid reagent, partial ester and catalyst, if employed, are mixed together and the resulting mixture heated at a temperature of from 85° to 150° C. for a period of time to complete the reaction. When operating at temperatures above the boiling temperature of water, the heating may be carried out under somewhat diminished pressure to remove the water of reaction as formed. In an alternative procedure, the acid reagent, partial ester and catalyst, if employed may be dispersed in an inert organic solvent and the resulting mixture heated at the boiling temperature. During the reaction a mixture of solvent and water of reaction may be continuously distilled out of the reaction vessel, condensed and the solvent recovered. Additional solvent may be introduced into the reaction zone as may be necessary. Upon completion of the reaction, the desired product may be separated by fractional distillation under reduced pressure.

In an alternative method, the new compounds may be prepared by reacting together (1) 2,2-dichloropropionic acid and (2) a partial ester of a chloroaryloxyacetic acid or a chloroaryloxypropionic acid and an aliphatic polyhydric alcohol selected from the group consisting of glycerol, ethylene glycol, propylene glycol, trimethylene glycol, butylene glycol and the di- and trialkylene glycols of the ethylene, propylene, and trimethylene series. The conditions of reaction, methods of contacting the reactants and separation of the desired product are all as have been previously described.

The following examples illustrate the invention but are not to be construed as limiting:

Example 1.—Ethylene glycol 2,2-dichloropropionate 2,4-dichlorophenoxyacetate 50 grams (0.269 mole) of ethylene glycol mono(2,2-dichloropropionate) (boiling at 148°–150° C. at 9 millimeters pressure), and 60 grams (0.275 mole) of 2,4-dichlorophenoxyacetic acid were dispersed in 300 milliliters of ethylene dichloride and the resulting mixture heated for a short period of time at the boiling temperature. One-half milliliter of concentrated sulfuric acid was then added to the mixture and heating thereafter continued for 17 hours at a temperature of from 89°–90° C. The temperature of the reaction mixture was then raised to 91°–92° C. and the mixture maintained at this temperature for a period of 24 hours. The heating was carried out with continuous distillation of ethylene dichloride together with the water of reaction as formed. Separation of the water and recycling of ethylene dichloride. Following the heating period, the reaction mixture was fractionally distilled under reduced pressure to separate an ethylene glycol 2,2-dichloropropionate 2,4-dichlorophenoxyacetate product as a viscous liquid. The latter had a boiling point of 221.5°–223.5° C. at 2 millimeters' pressure, a refractive index $n/D$ of 1.5335 at 25° C., a specific gravity of 1.4430 at 25°/25° C. and a chlorine content of 35.9 percent.

Example 2.—Glycerol 2,2-dichloropropionate bis(2,4,5-trichlorophenoxyacetate)

92 grams (1 mole) of glycerol and 510 grams (2 moles) of 2,4,5-trichlorophenoxyacetic acid were dispersed in 300 milliliters of ethylene dichloride and the resulting mixture heated for 55 hours at the boiling temperature. The heating was carried out with continuous distillation of ethylene dichloride together with the water of reaction as formed, separation of the water and recycling of ethylene dichloride. Following the heating period the ethylene dichloride was separated from the reaction mixture by fractional distillation was separated from the reaction mixture by fractional distillation under reduced pressure to obtain a glycerol bis(2,4,5-trichlorophenoxyacetate) product as a viscous liquid residue.

566 grams (1 mole) of the above glycerol bis(2,4,5-trichlorophenoxyacetate) product and 143 grams (1 mole) of 2,2-dichloropropionic acid were dispersed in 300 milliliters of ethylene dichloride and the resulting mixture heated for 24 hours at the boiling temperature. The heating was carried out with continuous distillation of ethylene dichloride and the water of reaction as formed, separation of the water and recycling of the ethylene dichloride. The reaction mixture was then diluted with one liter of ethylene dichloride and the resulting solution washed several times with water and thereafter dried with anhydrous sodium sulfate. The ethylene dichloride was then removed by fractional distillation to obtain a glycerol 2,2-dichloropropionate bis(2,4,5-trichlorophenoxyacetate) product as a residue. The latter was a resinous material having a chlorine content of 40.3 percent and a saponification number of 227.

Example 3.—Diethylene glycol 2,2-dichloropropionate 2-(2,4,5-trichlorophenoxy)-propionate 105 grams (0.45 mole) of diethylene glycol mono(2,2-dichloropropionate) (boiling at 148°–150° C. at 9 millimeters pressure), 121 grams (0.45 mole of 2-(2,4,5-trichlorophenoxy)-propionic acid and one milliliter of concentrated sulfuric acid were dispersed in 200 milliliters of ethylene dichloride and the resulting mixture heated for 16 hours at the boiling temperature. The heating was carried out with continuous distillation of ethylene dichloride and the water of reaction as formed, separation of the water and recycling of the ethylene dichloride. The reaction mixture was then washed several times with water and thereafter fractionally distilled under reduced pressure to separate a diethylene glycol 2,2-dichloropropionate 2-(2,4,5-trichlorophenoxy)-propionate product as a viscous liquid boiling at 215°–220° C. at 0.8 millimeter pressure and having a refractive index $n/D$ of 1.5290 at 25° C., a specific gravity of 1.4066 at 25°/25° C. and a chlorine content of 36.3 percent.

*Example 4.—Dipropylene glycol 2,2-dichloropropionate 2-(2,4-dichlorophenoxy)-propionate*

100 grams (0.35 mole) of dipropylene glycol mono(2,2-dichloropropionate) (boiling at 134°–135° C. at 7–8 millimeters pressure), 89 grams (0.35 mole) of 2-(2,4-dichlorophenoxy)-propionic acid and one milliliter of concentrated sulfuric acid were dispersed in 200 milliliters of ethylene dichloride and the resulting mixture heated for 17 hours at the boiling temperature. The heating was carried out as in the previously described manner with continuous distillation of ethylene dichloride and water of reaction and recycling of the ethylene dichloride. Following the reaction the mixture was washed several times with water and thereafter fractionally distilled under reduced pressure to separate a dipropylene glycol 2,2-dichloropropionate 2 - (2,4 - dichlorophenoxy) - propionate product as a viscous liquid having a refractive index $n/D$ of 1.5048 at 25° C., a specific gravity of 1.2943 at 25°/25° C., a chlorine content of 29.6 percent and a saponification index of 238.

*Example 5.—Trimethylene glycol 2,2-dichloropropionate 4-chloro-2-methylphenoxyacetate*

100 grams (0.49 mole) of trimethylene glycol mono-(2,2-dichloropropionate) (boiling at 180°–185° C. at 0.12 millimeter pressure), 98 grams (0.49 mole) of 4-chloro-2-methylphenoxyacetic acid and one milliliter of concentrated sulfuric acid were dispersed in 350 milliliters of ethylene dichloride and the resulting mixture heated for 19 hours at the boiling temperature. The heating was carried out in the usual fashion and the reaction mixture thereafter washed several times with water. The washed mixture was then fractionally distilled under reduced pressure to obtain a trimethylene glycol 2,2-dichloropropionate 4-chloro-2- methylphenoxyacetate product boiling at 180°–185° C. at 0.12 millimeter pressure and having a refractive index $n/D$ of 1.5131 at 25° C., a specific gravity of 1.3154 at 25°/25° C. and a chlorine content of 28.7 percent.

*Example 6.—Propylene glycol 2,2-dichloropropionate 2,4,5-trichlorophenoxyacetate*

One mole of propylene glycol mono(2,2-dichloropropionate) (having a refractive index $n/D$ of 1.4576 at 25° C. and a specific gravity of 1.2780 at 25°/25° C.), one mole of 2,4,5-trichlorophenoxyacetic acid and two milliliters of concentrated sulfuric acid are dispersed in 400 milliliters of ethylene dichloride and the resulting mixture heated in the usual manner and for 22 hours at the boiling temperature. The reaction mixture is then fractionally distilled under reduced pressure to separate a propylene glycol 2,2-dichloropropionate 2,4,5-trichlorophenoxyacetate product.

The new ester products have been tested and found effective as herbicides. For such use, the products may be dispersed on an inert finely divided solid and employed as dusts, also such mixtures may be dispersed in water with the aid of a wetting agent, and the resulting aqueous suspension employed as sprays. In other procedures, the products may be employed as constituents of oil-in-water emulsions or water dispersions with or without the adidtion of wetting, dispersing or emulsifying agents.

The partial esters employed as starting materials as previously described may be prepared by reacting together (1) a chloroaryloxyacetic acid, chloroaryloxypropionic acid or 2,2-dichloropropionic acid and (2) an aliphatic polyhydric alcohol selected from glycerol, ethylene glycol, propylene glycol, trimethylene glycol, butylene glycol and the di- and trialkylene glycols of the ethylene, propylene and trimethylene series. The reaction may be carried out in the presence of an esterification catalyst such as sulfuric acid and conveniently in a water-immiscible solvent such as ethylene dichloride. The employment of the proportion of at least one mole of polyhydric alcohol with an amount of acid equal in moles to one less than the number of hydroxyl units in the employed alcohol is essential for the accomplishment of the desired reaction, i. e. the synthesis of the partial esters. The reaction takes place smoothly at temperatures of from 90° to 150° C. Following the reaction, the desired partial ester product may be separated by fractional distillation under reduced pressure. The partial esters of the aliphatic polyhydric alcohols and α,α-dichloropropionic acid are disclosed in a copending application Serial No. 425,021, filed concurrently herewith, now U. S. Patent 2,734,076.

The term "butylene glycol" is construed in the present specification and claims to be inclusive of 1,2-butylene glycol, 1,3-butylene glycol, 2,3-butylene glycol and 1,4-butylene glycol. The term "alkylene" as employed herein refers to any bivalent aliphatic hydrocarbon radical having two free valences attached to different carbon atoms. The term "aliphatic polyhydric alcohol" as employed in the specification and claims refers to those alcohols which are free of reactive groups other than hydroxyl.

We claim:

1. A mixed ester of a polyhydric alcohol from the group consisting of glycerol, ethylene glycol, propylene glycol, trimethylene glycol and the di- and trialkylene glycols of the ethylene, propylene and trimethylene series, in which at least one hydroxyl is esterified with 2,2-dichloropropionic acid and the remaining hydroxyls of the alcohol are esterified with an acid from the group consisting of the chloroaryloxyacetic acids and chloroaryloxypropionic acids wherein the aryl group is of the benzene series.

2. Ethylene glycol 2,2-dichloropropionate 2,4-dichlorophenoxyacetate.

3. Glycerol 2,2-dichloropropionate bis(2,4,5-trichlorophenoxyacetate).

4. Diethylene glycol 2,2-dichloropropionate 2-(2,4,5-trichlorophenoxy)-propionate.

5. Dipropylene glycol 2,2-dichloropropionate 2-(2,4-dichlorophenoxy)-propionate.

6. Trimethylene glycol 2,2-dichloropropionate 4-chloro-2-methylphenoxyacetate.

References Cited in the file of this patent

UNITED STATES PATENTS

| | | |
|---|---|---|
| 2,121,266 | Grether et al. | June 21, 1938 |
| 2,523,188 | Britton et al. | Sept. 19, 1950 |
| 2,523,228 | Mullison | Sept. 19, 1950 |
| 2,596,089 | Allen | May 13, 1952 |
| 2,642,354 | Barrons | June 16, 1953 |
| 2,734,075 | Brust et al. | Feb. 7, 1956 |